March 29, 1966     J. I. WHITTLESEY     3,243,622
RETAINER FOR CONDUCTORS IN SLOTS
Filed Aug. 15, 1963
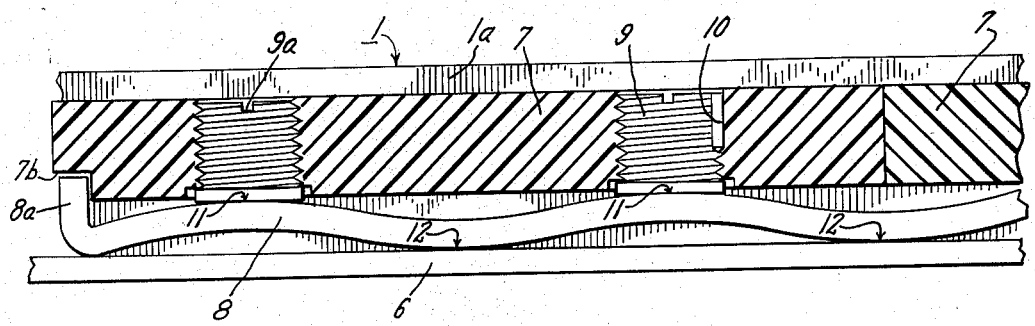
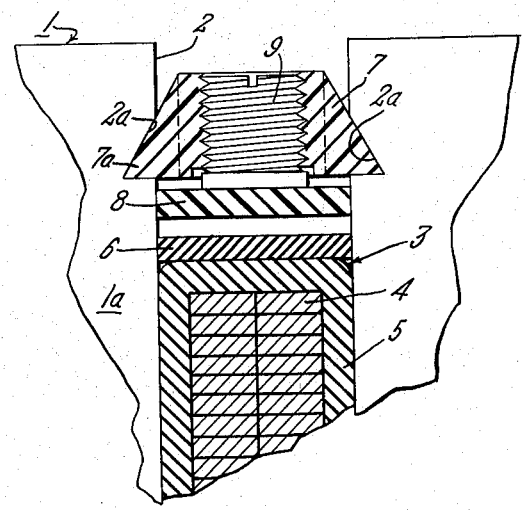
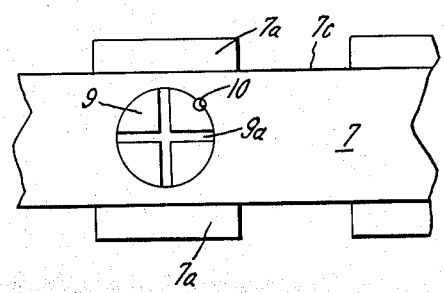
INVENTOR
JOSEPH I. WHITTLESEY
BY W. C. Crutcher
HIS ATTORNEY

United States Patent Office 3,243,622
Patented Mar. 29, 1966

3,243,622
RETAINER FOR CONDUCTORS IN SLOTS
Joseph I. Whittlesey, Schenectady, N.Y., assignor to General Electric Company, a corporation of New York
Filed Aug. 15, 1963, Ser. No. 302,777
5 Claims. (Cl. 310—214)

This invention relates to an improved device for holding insulated electrical conductors in the open slots of a magnetic core structure, such as the windings of a dynamoelectric machine, and more particularly the invention relates to an improved retaining device for holding the conductors in place under forces of determined magnitude along the length of the conductor.

It is necessary that the windings of an electrical device, such as a dynamoelectric machine, be held firmly in place against the electromagnetic forces tending to dislodge them in operation. One known means of holding the windings consists of driving insulated dovetail wedges along the slot. Such wedges have the disadvantage that, although they may be tight when assembled, they may tend to become loose should local shrinkage occur. Also local variations in dimension or shrinkage along the conductor means that the holding forces exerted by the wedges vary in magnitude along the conductor.

Constructions have been suggested for employing springs or resilient material either in the bottom of the slot or between the conductor and the wedge to compensate for local dimensional variations and to take up any looseness, should it occur. The primary disadvantage of such past constructions is that, if the spring is stiff enough to exert appreciable holding power, then it is very difficult to drive the wedge longitudinally along the slot over the top of the spring. Such a wedge is equally difficult to remove and may cause damage to the insulation during removal. On the other hand, if the spring is very resilient, so as to enable the wedge to be inserted relatively easily, then the spring may not offer sufficient holding power and may even aggravate the condition by allowing the conductor to exhibit vibratory resonance at certain critical frequencies.

Other constructions have been suggested for providing resilient biasing of the conductor downward in the slot, some of which have included provisions for inserting the wedge and biasing means radially into the slot. These, however, are difficult to assemble and do not provide the security of a longitudinally driven dovetail-type wedge.

Also, in either of the foregoing constructions, the use of springs does not necessarily result in uniform holding pressure at different points along the conductor. This is because the holding force varies with the displacement of the spring, and local dimensional variations affect the displacement and hence the holding force. Where the spring is very stiff, the holding force can vary greatly with small changes in bar or slot dimension.

Accordingly, one object of the present invention is to provide an improved device for retaining conductors in winding slots which can be inserted, adjusted and removed with relative ease.

Another object of the invention is to provide an improved retaining means for slot conductors which will provide spring biasing of the conductor in the slot to reduce the possibility of looseness in the slot.

Still another object of the invention is to provide an improved retaining device for slot conductors with means for external adjustment of the local holding force applied to the conductor by a radially acting follow-up spring.

Still another object of the invention is to provide an improved spring biased retaining device for slot conductors which can be inserted without causing damage, which can be adjusted to provide uniform pressure on the conductor along the slot, and which can be removed and re-used without difficulty.

Still another object of the invention is to provide an improved retainer for slot conductors, in which the holding force on the conductors can be adjusted locally and made uniform at any time after the retaining means is in place.

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

FIG. 1 is a longitudinal cross section of the retaining device as it appears in the slot of a dynamoelectric machine, FIG. 2 is a transverse cross section of the retaining device looking axially along the slot, and FIG. 3 is a plan view of a portion of the retaining device shown in FIGS. 1 and 2, looking downward toward the bottom of the slot.

Briefly stated, the invention is practiced by employing a leaf-type spring of insulating material in the top of the slot between the conductor and a dovetailed member inserted longitudinally into the slot. A number of longitudinally spaced rotatable members are arranged to exert downward pressure on spaced portions of the spring, when rotated. The rotatable members may be locked in place after a selected torque has been applied, and may later be unlocked or broken free when it is desired to remove the retaining device or to adjust the pressure of the spring.

Referring to FIGS. 1 and 2 of the drawing, a magnetic core structure 1, such as the stator core of a dynamoelectric machine, is comprised of laminations 1a which have been punched and aligned to form a longitudinally extending slot 2. Disposed in slot 2 is an insulated conductor 3 which, for example, may consist of lightly insulated strands 4 surrounded by a heavy layer of ground insulation 5. A filler strip 6 of insulating material is disposed in the slot on top of conductor 3. Extending longitudinally along slot 2 are a series of abutting retaining pieces 7, made of a rigid machinable insulating material, such as Textolite, manufactured by the General Electric Company. The retaining pieces 7 are arranged to slide axially in slot 2 by means of dovetail portions 7a on either side thereof, which nest in dovetail grooves 2a extending longitudinally along the slot. The portions 7a need not be shaped as shown, these being merely exemplary, but may be any convenient shape to hold the winding radially, yet permitting the retaining member to slide longitudinally. The lower surfaces of retaining pieces 7 are spaced above the filler strip 6.

Disposed in the space between retaining pieces 7 and filler strip 6 is an undulating or corrugated spring 8 of the leaf-type and made of insulating material. One suitable material for spring 8 is woven glass cloth embedded in cured epoxy resin. Another material which may be used is glass fiber roving, saturated with cured polyester resin. The depth of the corrugations has been exaggerated in the drawing for the purpose of clarity and the spring is actually almost flat in appearance so as to occupy a minimum space in the slot and to give a stiff "spring constant." For a glass cloth and epoxy resin spring, one suitable combination of dimensions which has been used is: depth of corrugation—68 mils; pitch (between arrows 12 on FIG. 1)—5 inches. The spring 8 may be of any convenient length and one spring may extend beneath several of the retaining members 7. For properly locating spring 8, the spring is provided with an upturned end 8a which fits in a recess 7b in the end of the retaining member.

Disposed along the retaining member 7 are two "jack screws" or threaded plugs 9 of a machinable insulating material, such as Textolite. The plugs 9 are longitudinally spaced from one another by an amount equal to the pitch of the corrugated spring 8. In the embodiment shown, there are two plugs 9 per retaining member 7, but the retaining members could be longer and contain several such plugs, if desired. The tops of plugs 9 are provided with grooves 9a to enable the plugs to be rotated from the top; the bottoms of the plugs are flat so as to make contact with the arched portions of spring 8 at points 11. Downward displacement of the spring at points 11 will, of course, cause an increasing downward force on the filler strip 6 and conductor 3 at points 12. It should be apparent that the local downward force on the conductor is proportional to the torque applied to plug 9 at grooves 9a on the other side of the retaining member. In other words, turning each plug 9 can be accomplished from outside by a torque wrench. Wrenches are available which will read the torque, and by placing the same torque on each plug, the same downward spring force will be present at each point 12.

Reference to the plan view of FIG. 3 indicates that the dovetail portion 7a of the retaining piece 7 may be missing at locations such as 7c to allow passage of cooling gas past the retaining piece. Also one means is disclosed in FIG. 3 of locking the jack screws or plugs 9 in place after a selected torque has been applied. A suitable adhesive, which is compatible with the insulating materials used for members 7, 9, is introduced by means of drilling a hole 10 downward at the intersection of the threads. A liquid adhesive, such as EC 847, manufactured by Minnesota Mining & Mfg. Company, is inserted into hole 10 and, when the plug 9 is rotated, it will distribute itself around the mating threads. The adhesive is such that it will bond the plug 9 firmly in position against any normal vibratory forces tending to rotate it while the machine is in operation, but is sufficiently weak that it can be broken loose by applying torque to the plug 9 with a torque wrench.

Of course, an alternate method would be to drill hole 10 after the plugs 9 are at the proper torque, and deform a malleable pin into the hole. This can be drilled out again when it is desired to remove the plug.

The operation of the improved retaining device is as follows. After the insulated conductor 3 and filler strip 6 are in the slot 2, the springs 8 are inserted and then the retaining members 7 are inserted and slid longitudinally in the slot in the dovetail grooves 2a. The bottoms of the plugs 9, at this time, are flush with the bottom of retaining members 7 so that the members 7 will slide freely over the spring 8 without causing abrasion or difficulty in insertion. Lips 8a on the springs will properly locate the retaining members 7, and after all of the retaining members are placed in the slot, the plugs 9 may be rotated to exert downward pressure on the arched portions of the spring at points 11. Since the downward force at each point 11 is separately adjustable, local variations in dimensions of the conductor 3 can be accounted for. If desired, after a preliminary tightening, the entire structure may be baked in an oven or otherwise cured, which may result in some retainer material shrinkage. Liquid adhesive is then inserted in holes 10, and a predetermined and selected torque is applied with a torque wrench to the plugs 9. The same torque applied to all of the jack screws will result in equal forces at points 11, 12 along the conductor, and hence a uniform holding force along the slot. The adhesive will then cure to hold the plugs 9 securely in this position.

After dynamoelectric machines have been in operation for some years, looseness or variations in dimension have inevitably occurred. A primary feature of the present invention is that during maintenance, the adhesive which prevents plugs 9 from rotating may be broken loose and all plugs reset with a uniform torque and locked in place again, without removing the retaining member 7 from the slot. In previous wedging arrangements, it has been necessary to remove the wedges and insert different size filler strips by trial-and-error or employ other means to remove the looseness.

In the event it is desired to replace a conductor 3, the plugs 9 may merely be unscrewed to allow the retaining member 7 to slip freely out of the slots and access to the conductors is had without any damage to insulation, wedges, springs, or any other pieces used in the assembly.

The invention offers improved performance in operation by exerting a uniform holding force on the bar at spaced locations along the bar with a spring followup action to reduce vibration. The invention offers improved ease of assembly and maintenance simplicity not found in prior spring-biasing arrangements.

While there is shown what is considered at present to be the preferred embodiment of the invention, it is of course understood that various other modifications may made therein, and it is intended to cover in the appended claims all such modifications as fall within the true spirit and scope of the invention.

What I claim as new and desire to secure by Letters Patent of the United States is:

1. A retaining device for holding a winding in place, comprising:
    an insulated conductor disposed in an open slot,
    a retaining member longitudinally slidable in said slot and spaced from said conductor,
    a leaf-type spring of insulating material disposed in the space between the conductor and the retaining member and having a raised portion spaced from the conductor, and
    a rotatable threaded plug extending through the retaining member and having its inner end disposed in abutting relation with said raised portion.

2. A retaining device for holding a winding in place, comprising:
    an insulated conductor disposed in an open slot,
    a plurality of dovetailed retaining members longitudinally slidable in said slot and spaced from said conductor,
    a longitudinally-undulating leaf spring of insulating material disposed in the space between the conductor and the retaining members, said spring having longitudinally spaced arched portions extending toward the retaining members,
    a plurality of threaded plugs constructed to be rotated from outside the slot and being longitudinally spaced along the retaining members and disposed in abutting relation with said spring arched portions, and
    means for locking the threaded plugs against rotation after a selected torque has been applied thereto.

3. In a dynamoelectric machine, the combination of:
    a laminated core structure defining a plurality of slots having longitudinal dovetail grooves therein,
    insulated conductor means disposed in said slots,
    a plurality of longitudinally insertable retaining members arranged to slide in said dovetail grooves and spaced relative to said conductor means with a clearance therebetween,
    undulating leaf spring means of insulating material disposed in said slot between the conductor means and the retaining member, said leaf spring means having alternating raised and depressed portions longitudinally spaced along the slot and including means to locate the leaf spring means at a predetermined position with respect to said retaining members,
    a plurality of threaded plugs of insulating material longitudinally spaced along said retaining members and threaded transversely therethrough, each of said plugs being disposed in abutting relation with one of said leaf spring raised portions, whereby rotation of the plugs individually from outside the slot will depress said raised portions to increase the local downward force on the conductor means, and means locking said plugs against rotation after a predetermined torque has been exerted thereon.

4. The combination of:
an insulated conductor disposed longitudinally in an open slot,
a dovetailed retaining member longitudinally slidable in said slot,
said conductor and said retaining member defining a clearance therebetween,
a spring longitudinally disposed within said clearance and compressed between said conductor and said retaining member, and
a plug threaded into and transversely movable through said retaining member,
said plug entering said clearance to abut said spring and being rotatable to vary the compression on said spring.

5. A dynamoelectric machine having windings mounted therein including,
longitudinal slots containing said windings,
dovetailed retaining members longitudinally slidable in said slots,
said windings and said retaining members defining clearances therebetween,
springs longitudinally disposed within said clearances and compressed between said windings and said retaining members, and
plugs threaded into and transversely movable through said retaining members,
said plugs entering said clearances to abut said springs and being rotatable to vary the compression on said springs.

References Cited by the Examiner

UNITED STATES PATENTS

| 888,456 | 5/1908 | Barr | 310—214 |

FOREIGN PATENTS

| 98,352 | 11/1924 | Austria. |
| 220,755 | 8/1924 | Great Britain. |
| 758,964 | 10/1956 | Great Britain. |
| 86,560 | 10/1957 | Netherlands. |

MILTON O. HIRSHFIELD, *Primary Examiner.*

ORIS L. RADER, *Examiner.*

J. J. SWARTZ, *Assistant Examiner.*